United States Patent [19]

Busch et al.

[11] Patent Number: 4,894,141

[45] Date of Patent: Jan. 16, 1990

[54] COMBINATION PROCESS FOR UPGRADING RESIDUAL OILS

[75] Inventors: Lloyd E. Busch; Paul W. Walters; Oliver Zandona, all of Ashland, Ky.

[73] Assignee: Ashland Oil, Inc., Ashland, Ky.

[21] Appl. No.: 567,487

[22] Filed: Jan. 3, 1984

Related U.S. Application Data

[63] Continuation-in-part of Ser. No. 355,661, Mar. 12, 1983, abandoned, which is a continuation-in-part of Ser. No. 304,992, Sep. 1, 1981, Pat. No. 4,434,044.

[51] Int. Cl.$^4$ .................... C10G 51/02; C10G 51/04
[52] U.S. Cl. .................................. 208/73; 208/85; 208/88; 208/251 R; 208/67
[58] Field of Search ............... 208/73, 88, 251 R, 91, 208/251 H

[56] References Cited

U.S. PATENT DOCUMENTS

| | | | |
|---|---|---|---|
| 2,293,636 | 1/1946 | Johnson | 196/52 |
| 2,378,531 | 6/1945 | Becker | 196/52 |
| 2,393,636 | 1/1946 | Johnson | 196/52 |
| 2,403,486 | 7/1946 | Barron | 196/49 |
| 2,414,002 | 1/1947 | Thomas | 208/164 |
| 2,455,419 | 12/1948 | Johnson | 260/449.6 |
| 2,462,891 | 3/1949 | Noll | 208/93 |
| 2,472,723 | 6/1949 | Peet | 196/50 |
| 2,485,315 | 10/1949 | Rex et al. | 208/127 |
| 2,526,881 | 10/1960 | Kunreuther | 196/52 |
| 2,688,401 | 9/1954 | Schmitkons et al. | 209/172 |
| 2,734,021 | 4/1956 | Martin | 196/49 |
| 2,766,184 | 10/1958 | Blanding | 196/49 |
| 2,882,218 | 4/1959 | Jewell | 208/74 |
| 2,956,004 | 10/1960 | Conn et al. | 208/91 |
| 2,981,674 | 4/1961 | Good | 208/73 |
| 3,008,896 | 11/1961 | Lawson | 206/74 |
| 3,063,932 | 11/1962 | Osborne | 206/74 |
| 3,072,560 | 1/1963 | Paterson et al. | 208/55 |
| 3,092,568 | 6/1963 | Atteridg | 206/113 |
| 3,146,188 | 8/1964 | Gossett | 206/73 |
| 3,303,123 | 2/1967 | Payton et al. | 206/76 |
| 3,338,821 | 8/1967 | Moyer et al. | 206/113 |
| 3,365,389 | 1/1968 | Spars et al. | 208/59 |
| 3,406,112 | 10/1968 | Bowles | 208/153 |
| 3,494,858 | 2/1970 | Luckenbach | 208/164 |
| 3,563,911 | 2/1971 | Pfeiffer et al. | 502/43 |
| 3,617,512 | 11/1971 | Brysan et al. | 208/120 |
| 3,699,037 | 10/1972 | Arnnesser et al. | 208/120 |
| 3,702,308 | 11/1972 | Bauer et al. | 252/417 |
| 3,763,034 | 10/1973 | Kett et al. | 208/78 |
| 3,767,566 | 10/1973 | Cartmell | 208/120 |
| 3,839,187 | 10/1974 | Van Venrooy | 208/214 |
| 3,857,794 | 12/1974 | Carey | 252/419 |
| 3,893,812 | 7/1975 | Conner et al. | 23/288 |
| 3,902,990 | 9/1975 | Luckenbach | 208/164 |
| 3,926,843 | 12/1975 | Owen | 208/120 |
| 3,944,482 | 3/1976 | Mitchell et al. | 208/120 |
| 3,990,992 | 11/1976 | McKinney | 252/417 |
| 4,002,557 | 1/1977 | Owen et al. | 208/120 |
| 4,010,003 | 3/1977 | Pulak | 23/288 |

(List continued on next page.)

FOREIGN PATENT DOCUMENTS 1187756  7/1955  Fed. Rep. of Germany.
2015564  1/1979  United Kingdom.

OTHER PUBLICATIONS

"Determination of Activity & Selectivity of Cracking Catalyst", R. V. Shankland & G. E. Schmitkons, Nov. 10–13, 1947.

Primary Examiner—Helane Myers
Attorney, Agent, or Firm—Richard C. Willson, Jr.; Stanley M. Welsh; James L. Wilson

[57] ABSTRACT

A process for upgrading topped crude oils and residual portions comprising material boiling above 552° C. (1025° F.) by the combination of partial demetallizing and decarbonizing of the residual oil before effecting zeolite catalytic cracking thereof is described in conjunction with a product separation process, a combined hydrocarbon gas product concentration section and the use of parallel arranged CO boilers to produce sulfur free flue gas and steam. Steam generated by the combination operation effectively reduces the energy requirement of the combustion process.

15 Claims, 7 Drawing Sheets

U.S. PATENT DOCUMENTS

| | | | |
|---|---|---|---|
| 4,018,868 | 4/1977 | Knight | 423/244 |
| 4,035,285 | 7/1977 | Owen et al. | 206/120 |
| 4,064,038 | 12/1977 | Vermilion, Jr. | 208/120 |
| 4,098,677 | 7/1978 | Waghorne | 208/113 |
| 4,147,617 | 4/1979 | Nace | 208/74 |
| 4,162,213 | 7/1979 | Zrimocak et al. | 208/89 |
| 4,176,084 | 11/1979 | Luckenbach | 252/417 |
| 4,177,158 | 12/1979 | Blue | 252/189 |
| 4,200,520 | 4/1980 | Gladrow et al. | 208/120 |
| 4,256,567 | 3/1981 | Bartholic | 208/252 |
| 4,260,475 | 4/1981 | Scott | 208/113 |
| 4,274,942 | 6/1981 | Bartholic et al. | 208/113 |
| 4,276,150 | 6/1981 | McHenry | 208/120 |
| 4,283,273 | 8/1981 | Owen | 208/113 |
| 4,300,998 | 11/1981 | Gartside | 208/127 |
| 4,309,274 | 1/1982 | Bartholic | 208/80 |
| 4,311,579 | 1/1982 | Bartholic | 208/73 |
| 4,325,817 | 4/1982 | Bartholic | 208/164 |
| 4,331,533 | 5/1982 | Dean | 208/113 |
| 4,332,673 | 6/1982 | Myers | 208/251 R |
| 4,347,122 | 8/1982 | Myers et al. | 208/251 R |
| 4,354,923 | 10/1982 | Myers et al. | 208/251 R |
| 4,374,021 | 2/1983 | Bartholic | 208/251 R |
| 4,377,470 | 3/1983 | Hettinger | 208/120 |
| 4,389,303 | 6/1983 | Simo et al. | 208/107 |
| 4,405,445 | 9/1983 | Kovach et al. | 208/120 |
| 4,425,259 | 1/1984 | Hettinger et al. | 502/74 |
| 4,434,044 | 2/1984 | Busch et al. | 208/91 |
| 4,435,279 | 3/1984 | Busch et al. | 208/111 |
| 4,469,588 | 9/1984 | Hettinger et al. | 208/77 |
| 4,478,708 | 10/1984 | Farnsworth | 208/161 |
| 4,479,870 | 10/1984 | Hammershaimt | 208/120 |

FIG. 4  MRS UNIT-CONTRACTOR/COMUSTOR SYSTEM

COMBINATION PROCESS FOR UPGRADING RESIDUAL OILS

This application is a continuation-in-part application of U.S. Ser. No. 355,661, filed on Mar. 12, 1982 now abandoned, which is itself a continuation-in-part of U.S. Ser. No. 304,992, filed on Sept. 1, 1981 now U.S. Pat. No. 4,434,044.

BACKGROUND OF THE INVENTION

Crude oil from which desired gaseous and liquid fuels are made contain a diverse mixture of hydrocarbons and other compounds which vary widely in molecular weight and structure and therefore boil over a wide range. For example, crude oils are known in which 30 to 60% or more of the total volume of the oil is composed of compounds boiling at temperatures above 343° C. (650° F.). Among these are crude oils in which about 10% to about 30% or more of the total volume consists of compounds so heavy in molecular weight that they boil above 552° C. (1025° F.) or at least will not boil below 552° C. (1025° F.) at atmospheric pressure.

Because these high boiling components of crude oil boiling above 343° C. (650° F.) and particularly above 538° C. (1000° F.) or 552° C. (1025° F.) are unsuitable for inclusion in gasoline and some higher boiling liquid hydrocarbon fuels, the petroleum refining industry has developed processes for separating and/or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached highly advanced state, many modified forms and variations thereof have been developed. Their unifying factor is identified with processing a restricted boiling range hydrocarbon feedstock which is caused to be cracked at an elevated temperature in contact with a cracking catalyst that is suspended in the feedstock under cracking conditions providing a discharge temperature in the range of 510° C. (950° F.) to 593° C. (1100° F.). Upon attainment of a desired degree of molecular weight and boiling point reduction the catalyst is separated from the desired catalytic conversion products.

Crude oils in the natural state contain a variety of materials which tend to have quite troublesome effects on FCC processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper, etc.), lighter metals (such as sodium, potassium, etc.), sulfur, nitrogen and others. Certain of these, such as the lighter metals, can be relatively economically removed by desalting operations, which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface and deactivate the catalyst.

If the catalyst is reused again and again for processing additional feedstock, which is usually the case, heavy metals in the feedstock can accumulate on the catalyst to the point that they unfavorably alter the composition of the catalyst and/or the nature of its effect upon the feedstock. For example, vanadium tends to form fluxes with certain components of commonly used FCC catalyst, lowering the melting point of portions of the catalyst particles sufficiently so that they begin to sinter and become ineffective cracking catalysts. Accumulations of vanadium and other heavy materials, especially nickel, also "poison" the catalyst. They tend in varying degrees to promote excessive dehydrogenation and aromatic condensation, resulting in excessive production of carbon and gases with consequent impairment of liquid fuel yield. An oil such as a topped crude or a residual crude fraction or other crude oil portions that are particularly abundant in nickel, vanadium and/or other metals exhibiting deactivating behavior, while containing relatively large quantities of coke precursors, is referred to herein as a carbo-metallic oil, and represents a particular challenge to the petroleum refiner.

There has been a long standing interest in the conversion of carbo-metallic oils into gasoline and other liquid fuels. For example, in the 1950's it was suggested that a variety of carbo-metallic oils could be successfully converted to gasoline and other products in the Houdresid process. The Houdresid process employed catalyst particles of "granular size" (much larger than conventional FCC catalyst particle size) in a compact gravitating bed, rather than suspending catalyst particles in feed and product vapors in a fluidized bed. The productivity of the process, compared to fluid catalytic cracking with lighter gas oils, was low. But the Houdresid process did offer some advantages. It appeared that the adverse effects previously encountered with heavy metals in the feed were not as great a barrier in the Houdresid process as one might expect in FCC processing. The heavy metal which accumulated on or near the outer surfaces of the catalyst particles apparently could be removed to some extent by an attrition process, which selectively removed an outer layer of metal-contaminated catalyst. The catalysts were very cheap, but also relatively inactive, highly unsuitable by today's standards. While the maximum tolerable limit of heavy metal contamination on catalyst in fluid catalytic cracking was then thought to be about 200 parts per million, the Houdresid process did continue to operate satisfactorily even when the total nickel plus vanadium content of the catalyst had reached 870 ppm. Moreover, it was found that the required levels of selectivity could be maintained without withdrawing catalyst from the process, except to the extent that withdrawal was required by normal mechanical losses (e.g. attrition and inadvertent discharge with off gases) and by the attrition used to control metals level. Today such attrition of catalyst to fine particulates would present an expensive environmental problem, thus considerably increasing difficulties involved in practicing the process.

Although the Houdresid process obviously represented a step forward in dealing with the effects of metal contamination and coke formation on catalyst performance, its productivity was limited. Thus, for the 25 years which have passed since the Houdresid process was first introduced commercially, the art has continued its arduous search for suitable modifications or alternatives to the FCC process which would permit commercially successful operation on reduced crude and the like. During this period a number of proposals have been made; some have been used commercially to a certain extent.

Several proposals involve treating a heavy oil feed to remove the metal therefrom prior to cracking, such as by hydrotreating solvent extraction and complexing with Friedel-Crafts catalysts, but these techniques have been criticized as unjustified economically. Another proposal employs a combination cracking process having "dirty oil" and "clean oil" units. Still another proposal blends residual oil with gas oil and controls the quantity of residual oil in the mixture in relation to the equilibrium flash vaporization temperature at the bottom of the riser type cracker unit employed in the process. Still another proposal subjects the feed to a mild preliminary hydrocracking or hydrotreating operation before it is introduced into the cracking unit. It has also been suggested to contact a carbo-metallic oil such as reduced crude with hot taconite pellets to produce gasoline. This is a small sampling of the many proposals which have appeared in the patent literature and technical reports.

Notwithstanding the great effort which has been expended and the fact that each of these proposals overcomes some of the difficulties involved, conventional FCC practice today bears mute testimony to the dearth of carbo-metallic oil-cracking techniques that are both economical and highly practical in terms of technical feasibility. Some crude oils are relatively free of coke precursors or heavy metals or both, and the troublesome components of crude oil are for the most part concentrated in the highest boiling fractions. Accordingly, it has been possible to largely avoid the problems of coke precursors and heavy metals by sacrificing the liquid fuel yield which would be potentially available from the highest boiling fractions. More particularly, conventional FCC practice has employed as a part of the gas oil feedstock that fraction of crude oil which boils at about 343° C. (650° F.) to about 538° C. (1000° F.), such fractions being relatively free or comprising less of heavy metal contamination. Such feedstock, known as "vacuum gas oil" (VGO) is generally prepared from crude oil by distilling off the fractions boiling above about 343° C. (650° F.) at atmospheric pressure and then separating by vacuum distillation the heavy resid material from light and heavy gas oils boiling between about 343° C. (650° F.) and about 482° C. (900° F.) to 552° C. (1025° F.).

An oil fraction of atmospheric distillation boiling below about 343° C. (650° F.) may be used in combination with vacuum gas oils as feedstock for the more conventional FCC processing. The heavier fractions of the crude oil such as vacuum resid are normally employed for a variety of other purposes, such as for instance production of asphalt #6 fuel oil, or as marine Bunker C fuel oil, which represents a great waste of the potential value of this portion of the crude oil barrel, especially in light of the great effort and expense which the art has been willing to expend in the attempt to produce generally similar materials from coal and shale oils.

The present invention is aimed at the cracking of gas oils with an initial boiling point of 316° C. (600° F.) to 371° C. (700° F.) and heavier fractions of crude oils containing substantial quantities of both coke precursors, heavy metals, and other troublesome components either alone or in conjunction with the lighter gas oils, thereby increasing the overall yield of gasoline and other desired gaseous and liquid fuels from a given crude oil barrel. The process of this invention is uniquely advantageous for dealing with the problem of treating high boiling carbo-metallic oils boiling above 323° C. (650° F.) in an economically and technically sound manner.

In general the coke-forming tendency or coke precursor content of an oil can be ascertained by determining the weight percent of carbon remaining after a sample of that oil has been pyrolized. The industry accepts this value as a measure of the extent to which a given oil tends to form non-catalytic coke when employed as feedstock in a catalytic cracking operation. Two established tests are recognized, the Conradson Carbon and Ramsbottom Carbon tests, the latter being described in ASTM Test No. D524-76. In conventional FCC practice, Ramsbottom carbon values on the order of about 0.1 to about 1.0 are regarded as indicative of acceptable feed. The present invention is concerned with the use of hydrocarbon feedstocks which have higher Ramsbottom carbon values and Conradson carbon values in excess of 2 and thus exhibit substantially greater potential for coke formation then the more usual relatively clean gas oil feeds.

Since the various heavy metals found in crude oils are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L. Nelson in *Oil and Gas Journal*, page 143, Oct. 23, 1961) in which the content of each metal present is expressed in parts per million of such metal, as metal, on a weight basis, based on the weight of feed:

$$\text{Nickel Equivalents} = \text{Ni} + \frac{V}{4.8} + \frac{Fe}{7.1} + \frac{Cu}{1.23}$$

According to conventional FCC practice, the heavy metal content of feedstock for FCC processing is controlled at a relatively low level e.g. about 0.25 ppm Nickel Equivalents or less. The present invention is concerned with the processing of feedstocks containing metals substantially in excess of this value, and which therefore have a significantly greater potential for accumulating on and poisoning catalyst.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 200 to about 600 ppm Nickel Equivalents. The process of the present invention is concerned with the use of catalyst having a substantially larger metals content, and which therefore has a much greater than normal tendency to promote dehydrogenation, aromatic condensation, gas production or coke formation. Therefore, such higher metals accumulation is normally regarded as quite undesirable in FCC processing.

SUMMARY OF THE INVENTION

The present invention is concerned with the conversion of the higher boiling portions of crude oils known as topped crudes, residual oils and/or reduced crudes recovered as the bottom product of atmospheric and/or vacuum distillation and containing substantial quantities of coke precursors and heavy metal contaminants, sulfur and nitrogen compounds. Sodium found in crude oil is also a troublesome component in deactivating a cracking catalyst. The combination process of this invention is regarded as a unique sequence of operations designed to dispose of and/or handle the undesirable components of reduced crudes in a manner permitting conversion of high boiling hydrocarbon components in association therewith to more desirable gaseous and liquid fuel products.

The combination of unique steps contributing to the novel processing combination of this invention represents a highly productive approach to the conversion and recovery of product of conversion of high boiling crude oil feedstocks comprising carbo-metallic feed components such as found in topped crudes, residual oils, reduced crudes and resids. A petroleum crude oil and particularly the 343° C. (650° F.) plus portion thereof is characterized in the absence of further treatment as having a heavy metals content of at least about 5 ppm of Ni equivalents by weight and a carbon residue on pyrolysis of at least about 1% by wight.

Some hydrocarbon feeds which may be processed in the combination operation of this invention are specifically identified in Table 1 below.

FIG. 4 identifies an arrangement of apparatus for accomplishing partial demetallization and decarbonization of a residual portion of crude oil with an inert sorbent particle material and regeneration of the used sorbent particles.

FIG. 5 identifies an arrangement of apparatus for effecting catalytic cracking of a partially decarbonized heavy oil feed obtained from the arrangement of FIG. 4 and regenerating catalyst particles so used in a temperature-restricted two-stage catalyst regeneration operation.

FIG. 6 identifies a combination of processing steps for separating the product of the demetallizing and decarbonizing step of FIG. 4 and preparation of heavy oil feed charged thereto.

FIG. 7 identifies an arrangement of processing steps for separating the product of catalytic cracking and obtained from the apparatus arrangement of FIG. 5.

DISCUSSION OF THE DRAWINGS

FIG. 1 is a block flow arrangement of an integrated combination of processing steps for upgrading the higher boiling portions of crude oil known as resids, residual oils, and reduced crudes comprising metal contaminants and relatively high Conradson carbon producing materials. More particularly the combination of processing steps generally represented by FIG. 1 comprise a metals-carbon removal contact step with a relatively inert solids sorbent material followed by a more severe catalytic conversion operation designed and operated to produce gasoline and lower boiling hydrocarbons as well as upgraded higher boiling liquid prod-

TABLE I

| Oil or Crude | API Grav. 650+[2] Total | % of 650+ Boiling at 650 1025 | % of 650+ Boiling at 650− 1025+ | Ramsbottom Carbon Content 650+ 1025 | Ramsbottom Carbon Content Total | Wt. ppm Metals[3] Ni | Wt. ppm Metals[3] V | Wt. ppm Metals[3] Fe | Ni Equiv. | Wt % S in 650+ Total | Weight of Nitrogen (ppm) 650+ Fraction Total | Weight of Nitrogen (ppm) 650+ Fraction Basic | Wt. ppm Na |
|---|---|---|---|---|---|---|---|---|---|---|---|---|---|
| VGO | 28.4 | 100 | 0.0 | 0.38 | 0.38 | 0.2 | 0.1 | 2.6 | .059 | .83 | 722 | 260 | 0.8 |
| Mexican Isthmus | 16.9 (21.3) | 65.3 | 34.7 | 0.49 | 4.96 | 2.5+ | 33.8 | 1.9 | 9.81 | 2.75 | 950 | 450 | 0.9 |
| Mexican Kirkuk[1] | 17.4 | | | | 9.30 | 35.0 | 99.0 | 17.0 | 58.02 | 2.94 | 2100 | 723 | 1.8 |
| Murban | 23.1 | 78.7 | 21.3 | 0.49 | 3.99 | 3.0+ | 1.5 | 11.9 | 4.99 | 1.64 | 512 | 200 | 7.5 |
| Arabian Light | 19.1 | 64.7 | 35.3 | 0.47 | 6.56 | 6.4 | 24.7 | 3.2 | 12.00 | 2.39 | 940 | 507 | 9.2 |
| Arabian Med. | 14.5 | 51.8 | 48.2 | 0.46 | 9.00 | 19.6 | 63.0 | 2.9 | 33.13 | 4.43 | | | |
| Ekofisk | 22.7 | 72.8 | 27.2 | 0.36 | 4.42 | 1.4 | 3.0 | 2.4 | 2.36 | 0.38 | | | |
| Fosterton | 10.9 | 43.6 | 56.4 | 0.42 | 16.81 | 48.8 | 119.0 | 3.1 | 74.03 | 4.22 | | | |
| Iranian Light | 17.4 | 60.8 | 39.2 | 0.48 | 9.01 | 21.9 | 60.0 | 3.1 | 34.84 | 2.50[4] | | | |
| La./Miss Sweet | 23.7 | 80.2 | 19.8 | 0.33 | 4.36 | 2.7+ | — | 8.5 | 3.90 | 0.26 | | | |
| Wyoming Sour | 12.4 | 40.7 | 59.3 | 0.32 | 15.1 | 0.6 | 70.0 | 2.0 | 15.47 | 3.84 | | | |

[1] A refinery blend of Mexican and Kirkuk crudes.
[2] Throughout the table 650 and 1025 refer to 605° F. and 1025° F. respectively; 650+ refers to 650° F.+ material as defined below.
[3] Copper level was below 0.5%, except that Mexican Kirkuk contained 0.6%; all metals expressed as metal in ppm, based on the weight of the 650+ fraction.
[4] Calculated.

Figure 1:
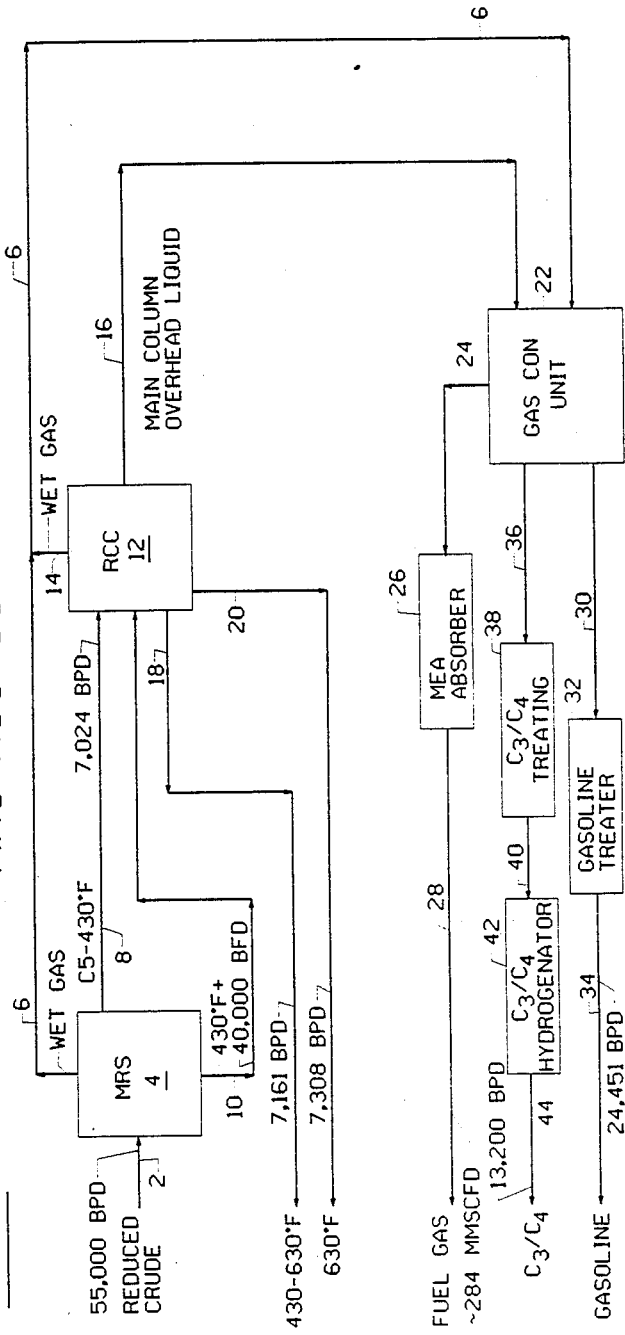
FIG. 1 is a block flow diagram of an integrated combination of processing steps for upgrading the higher boiling residual portions of crude oils comprising a feed demetallizing-decarbonizing step, a catalytic cracking step of the decarbonized feed and product treating steps.

ucts more suitable for further conversion to liquid and gaseous fuel products. A high activity fluid catalytic cracking catalyst comprising some accumulated metal contaminants is used in a further separate downstream cracking zone to convert the partially decarbonized and demetallized feed referred to as upgraded high boiling liquid products. The integrated combination operatio of FIG. 1 is a heat balanced energy efficient operation which utilizes a combination of fluid solids combustion zones shown in FIG. 2 to generate high pressure process steam from regeneration flue gases, CO rich, and effect the recovery of sulfur oxides by reaction with calcined limestone (calcium oxide) to produce calcium sulfate. This generated high pressure steam arrangement is utilized in a steam distribution and recovery system which effectively contributes to the thermal efficiency of the combination of processing steps herein described. A common gaseous hydrocarbon product concentration and recovery section of the separate solids contacting steps and represented by FIG. 3 materially contributes to the operating efficiency of the combination operation.

Figure 4:
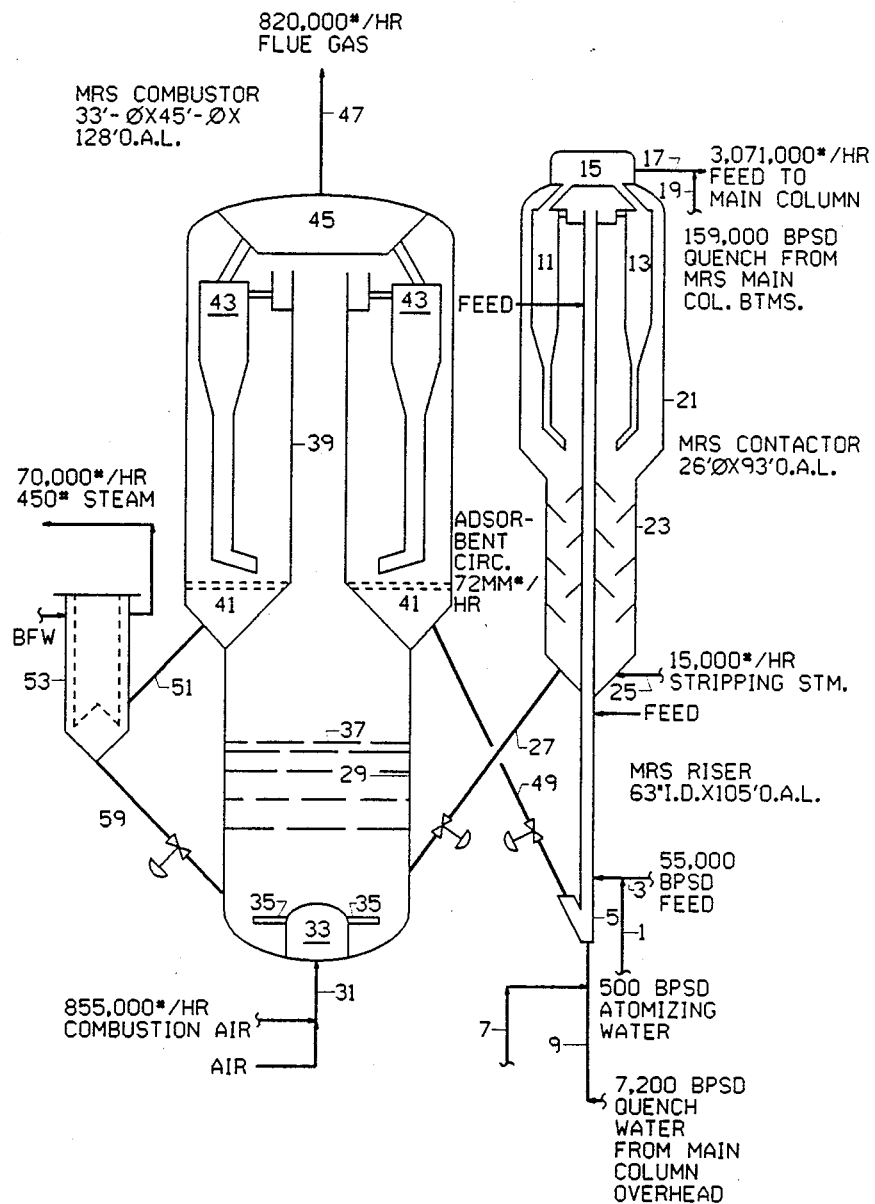

FIG. 4 is an arrangement of apparatus identified as the (MRS) metals removal system unit considered in one aspect as a thermal visbreaker relying on hot fluidizable inert solids for effecting initial contact of a reduced crude containing feed as herein identified with a solid sorbent material of little or no catalytic activity to effect removal of metal contaminants and effect thermal degradation of high boiling Conradson carbon forming materials in the feed. In the fluid solids thermal visbreaking system (MRS) effected at an elevated temperature providing a vaporized product within the range of 482° (900° C.) to 566° C. (1050° F.), it is desirable to employ a riser contact zone which permits maintaining the hydrocarbon feed residence time below about 5 seconds, more usually below about 3 seconds and preferably from 0.5 to 2 seconds at space velocity conditions which will restrict thermal cracking to produce naphtha material and yet provide a thermally visbroken vaporous product of reduced metals and Conradson carbon producing components. A feed is thus obtained which is more suitable for zeolite catalytic cracking in a downstream catalytic cracking-catalyst regeneration system shown in FIG. 5. In the arrangement of FIG. 4, provision is made for rapidly quenching the thermally produced vaporous product immediately upon discharge from the riser reactor separator vessel section employing as quench fluid main column product fractionator bottoms obtained as hereinafter discussed with respect to FIG. 6. The quenched vaporous product comprising a demetallized feed material of less than about 100 ppm of (Ni+V) nickel plus vanadium and preferably reduced to 50 ppm nickel equivalents following separation in the MRS main column section of FIG. 6 is charged as a more clean feed to the RCC zeolite catalyst operation of FIG. 5. MRS recovered thermal naphtha and water recovered from the fractionator overhead drum may be mixed with the oil feeds as more fully discussed below with respect to FIG. 7.

The integrated operation of this invention briefly outlined above is a coalescence of novel operating contributions specifically discussed below which synergistically contribute one to the other to form a novel combination of steps for efficiently processing distress hydrocarbon stocks to more desirable gaseous and liquid product in an economically satisfactory manner. The distress stocks which may be processed by the combination operation of this invention includes fractions of atmospheric and vacuum distillation such as topped crudes, residual oil, resids, reduced crudes and other heavy hydrocarbon materials obtained from coal, oil, shale, tar sands and a combination of such materials. Generally speaking, the oil feeds will all boil above about 316° C. (600° F.), 343° C. (650° F.) or 371° C. (700° F.) and comprise high molecular weight hydrocarbon components not vaporizable at temperatures below about 538° C. (1000° F.) or 552° C. (1025° F.). Thus depending on feed source and levels of contamination, the initial boiling point of the charge to the MRS unit may be within the range of 371° C. (700° F.) up to 538° C. (1000° F.).

The effects of metal contaminants and Conradson carbon found in the heavy ends of crude oils and other such source materials has been widely discussed in the literature. A recent article entitled "Burst of Advance Enhances Cat Cracking" by D. F. Tolen published in the Annual Refining Report of the Oil and Gas Journal, Mar 30, 1981 is an up to date treatise on the subject and is incorporated herein by reference thereto. The present invention is particularly concerned with increasing the yield of desired product from the bottom or high boiling portion of petroleum crudes. The invention is also concerned with a process which can be utilized to more economically produce premium petroleum products such as gasoline, diesel fuel and gaseous products readily converted to needed useful products in modern day society. More importantly the combination operation of this invention is a thermally attractive energy efficient method for selectively removing and utilizing undesirable high boiling components of crude oils and metal contaminants in the production of more desirable premium fuel. The present invention particularly concentrates on upgrading the "bottom of the barrel" of a crude oil to useful products.

DISCUSSION OF PREFERRED EMBODIMENTS

Referring now to FIG. 1 by way of example, there is shown a simplified block flow arrangement of the combination process of this invention. In the specific arrangment of FIG. 1 a high boiling hydrocarbon feed such as a reduced crude, a residual oil feed boiling above about 343° C. (650°) and comprising reduced crude components such a porphyrins, asphaltenes and polycyclic compounds are charged by conduit 2 to a MRS metal removal thermal visbreaking operation 4 wherein the feed is contacted with solid sorbent particulate material having little if any cracking activity under conditions to thermally visbreak, less than 100 ppm nickel equivalent, partially decarbonize the heavy oil feed and reduce metal contaminants to a more acceptable lower level in conjunction with reducing the feed Conradson carbon value below 10 and more usually to at least 6. During this thermal contacting operation with solid sorbent particulate material more fully discussed herein with respect to FIG. 4, a wet gas product formed during MRS thermal visbreaking is recovered by conduit 6, a $C_5+$ naphtha product is recovered by conduit 8 and a 221° C.+ (430° F.+) product material is recovered by conduit 10. The $C_5$ plus product material in conduit 8 and the 221° C. (430° F.) plus product material in conduit 10 are charged to an RCC (reduced crude catalytic cracking) unit 12 more fully discussed below with respect to FIG. 5. During catalytic cracking conversion of the demetallized and decarbonized feed material obtained from the MRS thermal conversion operation on zone 12, a wet gas product stream is formed and recovered by conduit 14, a main column overhead liquid is recovered by conduit 16, a 221° C. (430° F.) to 332° C. (630° F.) product fraction is recovered by conduit 18 and a 331° C. (630° F.) plus unconverted feed material is recovered by conduit 20. The catalytic conversion products recovered by conduits 18 and 20 may be used in fuel oil blending operations not shown. On the other hand the 332° C. (630° F.) plus heavy cycle oil product may be further converted by catalytic cracking either in a separate (FCC) fluid catalytic cracking unit not shown or as recycle to the RCC unit 12. The 221° C.-332° C. (430° F.-630° F.) product in conduit 18 may also be further refined as desired to meet fuel demands as by cracking, hydrogeneration and other processing steps suitable for the purpose. The RCC Main column overhead liquid in conduit 16 is passed to a gas concentration and separation unit 22 discussed below. So also is the wet gas in conduits 6 and 14 blended and passed by conduit 6 to unit 22. A detailed discussion of the gas concentration and separation unit operation is provided below with respect to FIG. 3. The operation of the gas concentration unit provides a fuel gas stream withdrawn by conduit 24, which material is then passed to an MEA absorber 26 before being recovered by conduit 28. A gasoline product boiling in the range of $C_5$ hydrocarbons up to about 204° C. (400° F.) or 221° C. (430° F.) is recovered from unit 22 by conduit 30 and passed to a gasoline treating unit 32 before being recovered by conduit 34. In gasoline treating unit 32 it is contemplated treating the gasoline with a caustic wash and an electrostatic precipitator to remove undesired impurities in a manner known in the industry.

A $C_3/C_4$ product fraction is recovered from unit 22 by conduit 36 and passed to a $C_3/C_4$ treating unit 38. In unit 38, the $C_3/C_4$ fraction is treated to remove sulfur impurities and then caustic washed.

The product of treating unit 38 may be passed by conduit 40 to a hydrogeneration unit 42 designed to particularly accomplish hydrogenation of diolefins before being recovered by conduit 44.

Figure 6:
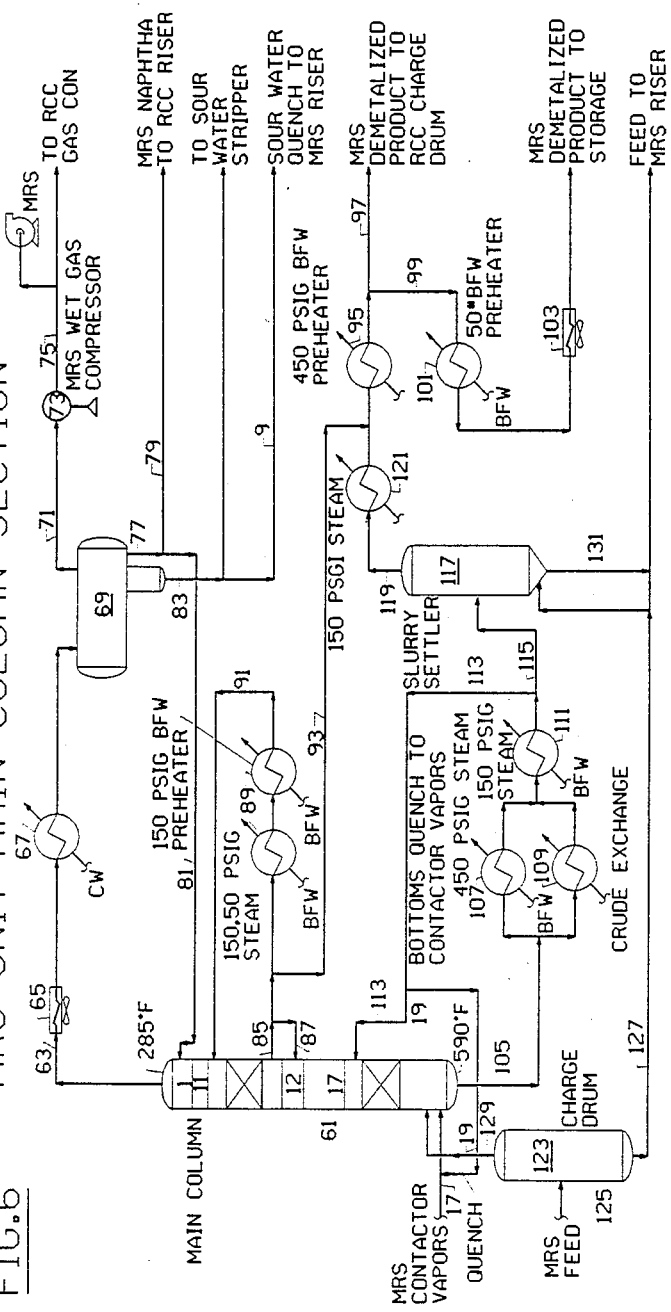
Figure 7:
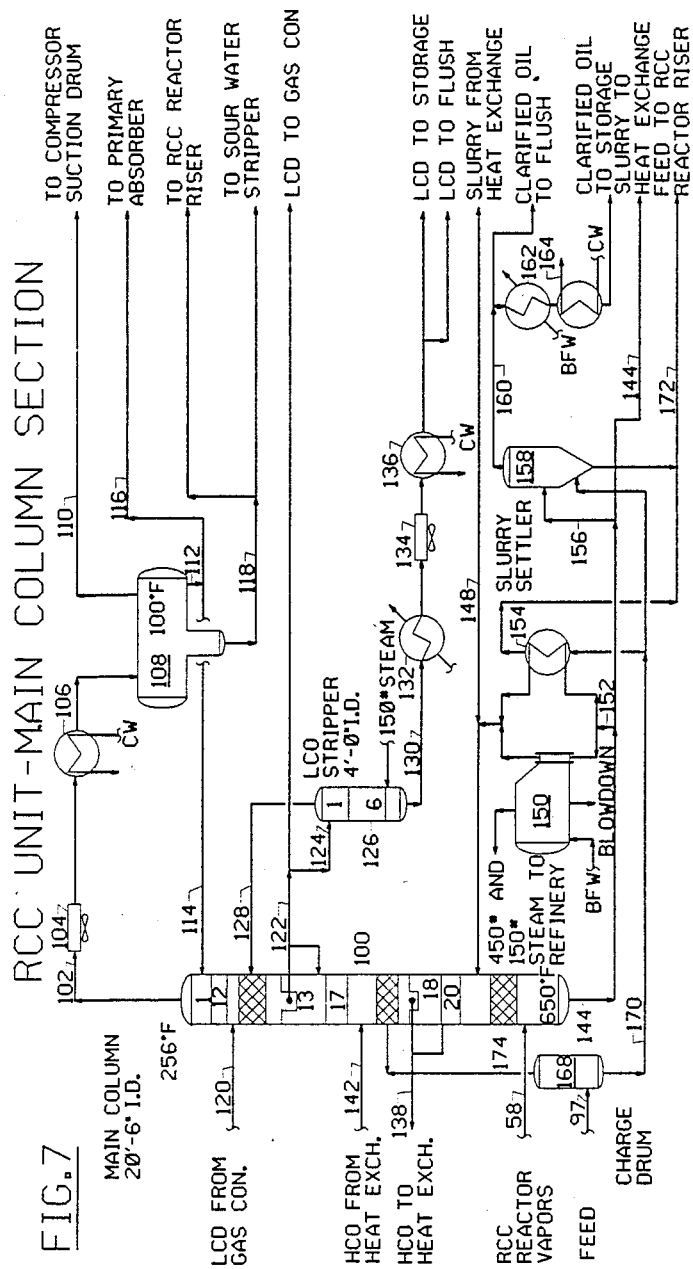

Referring now to FIG. 4 by way of example there is shown one arrangement of apparatus for effecting thermal contact of the residual oil or reduced crude containing feed with a solid sorbent material to accomplish metals removal (demetallizing) and (decarbonizing) to reduce the Conradson carbon producing components of the feed. The contact system of FIG. 4 is referred to herein as the MRS system (metals removal system) accomplished by thermal visbreaking. A riser contact zone is provided for selectively thermally converting the charge heavy residual oil feed comprising metal contaminants preferably in an atomized condition for contact with a solid sorbent particulate material such as a kaolin solid particulate sorbent material of little or no catalytic cracking activity or other suitable sorbent particle material at a temperature within the range of 482° C. (900° F.) to 566° C. (1050° F.) under space velocity conditions and hydrocarbon feed partial pressure selected to accomplish substantial decarbonizing of the feed and metals removal preferably in the absence of substantial thermal cracking to form thermal naphtha and lower boiling range products. In the specific arrangement of FIG. 4, atomizing water is added by conduit 1 to a reduced crude or heavy residual oil containing feed introduced by conduit 3 to a riser reactor 5 and above the bottom portion thereof. Steam in conduit 7 and/or admixed with water in conduit 9 obtained from the main column overhead drum discussed below with respect to FIG. 7 is admixed with circulated hot solid particulate at a temperature in the range of 704° C. (1300° F.) to 815° C. (1500° F.) in the bottom portion of the riser in an amount and under conditions selected to reduce the temperature of the hot solids obtained from regeneration thereof and before contacting the oil feed selected for thermal conversion in the riser reactor. If desired, the "wet gas" recycled from the RCC or MRS unit or other lift gas (e.g. light hydrocarbons) can be employed to convey the solid particulate through an initial portion of the riser reactor 5. The particular combination of diluents admixed with solids permits establishing a desired vertical velocity component to the solids before contact with dispersed hydrocarbon feed material in the riser under selected temperature and pressure conditions. A suspension of solid sorbent particulate and atomized feed product of thermal visbreaking of low partial pressure in the presence of a diluent and at a temperature below about 552° C. (1025° F.) is recovered from the riser 5 discharge end at a velocity providing a hydrocarbon residence time less than 5 seconds and preferably within the range of 0.5 up to 2, 3, or 4 seconds as desired. The riser 5 is provided with a plurality of vertically spaced apart feed inlet means to accomplish the above desired change in hydrocarbon riser residence time. The suspension passed through riser 5 is discharged from the top or open upper end of the riser and separated so that vaporous hydrocarbons of thermal visbreaking and gasiform diluent material are caused to flow through a plurality of parallel arranged cyclone separators 11 and 13 positioned about the annular cup about the upper open end of the riser contact zone. Hydrocarbon vapors separated from entrained solids by the cyclone separators are collected in a plenum chamber 15 for recovery as a vapor by conduit 17 at a temperature of about 521° C. (970° F.). The vaporous material in conduit 17 is quenched to a temperature well below its dewpoint by admixture with a portion of the main column bottoms product in conduit 19 of the MRS (metals removal system) product recovery section of FIG. 6 more fully discussed below. Solid particulate material comprising kaolin particulate in this specific embodiment comprising accumulated metal deposits and deposited carbonaceous material of thermal degradation are collected in a bottom portion of vessel 21 comprising a stripping section 23 to which stripping gas is charged by conduit 25 at a temperature of at least about 204° C. (400° F.). Higher stripping temperatures up to 566° C. (1050° F.) are also contemplated. Stripped solid absorbent particulate material is passed by standpipe 27 provided with a flow control valve to a fluid bed of inert particulate in a bottom portion of a fluid bed of solids in regeneration zone 29. Regeneration gas or combustion supporting gas such as oxygen modified gas or air is charged to a bottom portion of the bed of solids in regeneration zone 29 by conduit 31 through a plenum distribution chamber 33 supporting a plurality of radiating gas distributor pipes 35. Regeneration of solid sorbent particulate by burning deposited carbonaceous material is accomplished at a temperature up to about 815° C. (1500° F.) preferably in an oxygen lean or restricted oxygen containing gas atmosphere promoting the formation of a (CO) carbon monoxide rich regeneration flue gas. If desired, the solids can be regenerated with more $O_2$ to produce $CO_2$ rich flue gases. Combustion product gases and sorbent solids pass from an upper level 37 of the fluid bed of solid particulate through a restricted passageway 39 as a suspended mass of solid particulates in flue gases for discharge separation in an upper enlarged portion of the regeneration vessel. A separation is made between solid particulate and product flue gases by the combination of ballistic separation, hindered settling and cyclone separation means. The separated solid particulate is collected as a fluid bed of material 41 in an annular bottom zone about the restricted passageway 39. Flue gas separated from solids pass through a plurality a cyclones 43 positioned about the open upper annular cup about the end of passageway 39 for removal of entrained fines. The CO rich flue gases then pass to plenum chamber 45 for withdrawal therefrom by conduit 47. Further disposition and utilization of the flue gas in conduit 47 is discussed more fully below with respect to FIG. 2. Regenerated solid sorbent particulate at an elevated temperature within the range of 538° C. (1000° F.) to 815° C. (1500° F.) and more usually not above 760° C. (1400° F.) is passed by standpipe 49 to the bottom portion of riser 5 for use as herein proposed. A portion of the hot regenerated solid sorbent is withdrawn by conduit 51 for passage to a heat exchanger 53 wherein for example 450 lbs. steam is particularly generated by indirect heat exchanged with charged boiler feed water introduced by conduit 55 and steam recovered by conduit 57. The thus partially cooled solid particulate is withdrawn by conduit 59 for passage to a bottom portion of the fluid bed of solid particulate in a bottom portion of regeneration zone 29 for temperature control during combustion of deposited hydrocarbonacious on contaminated particulate being regenerated.

FIG. 6 is concerned particularly with the product recovery section of the MRS unit for the recovery of different valuable fractions and heat exchange utilization contributing to the overall efficiency of the combination operation. In the arrangement of FIG. 6, the demetallized vapors recovered by conduit 17 from the MRS zone of FIG. 4 and following the addition of quench fluid substantially immediately upon recovery from plenum 15 is charged to a product fractionating or main column 61 of FIG. 6 maintained at a bottom temperature of about 310° C. (590° F.) and a top temperature of about 141° C. (285° F.). A gaseous material is withdrawn at a temperature of about 141° C. (285° F.) from the column by conduit 63 for passage through air cooler 65, cooler 67 and thence to drum 69 wherein a separation is made at a temperature sufficiently reduced to recover a gasiform stream by conduit 71 passed to compressor 73 and then by conduit 75 to the gas concentration system of FIG. 3. A naphtha fraction is recovered from drum 69 by conduit 77, a portion of which is recovered by conduit 79 for recycle to the riser reactor 5 of FIG. 4 with the remaining portion thereof being recycled as reflux to column 61 by conduit 81 to an upper portion of the MRS main column 61. A sour water stream is recovered from drum 69 by conduit 83, a portion of which is passed to a sour water stripper not shown with the remaining portion being recycled to the MRS riser reactor 5 as quence fluid introduced by conduit 9 or as atomizing fluid introduced by conduit 1. An intermediate boiling range product fraction boiling above naphtha boiling material is withdrawn by conduit 85, a portion of which is recycled to the column as pump around by conduit 87, with another portion thereof being passed through a plurality of heat exchangers 89 to which boiler feed water is introduced to develop low pressure 150 psig stream before being recycled to the main column by conduit 91. Another portion of the material withdrawn by conduit 85 is passed by conduit 83 to heat exchanger 95 for indirect heat exchange with boiler feed water and received therefrom by conduit 97 for use as a portion of the demetallized oil charge passed to the RCC unit discussed below with respect to FIG. 5. On the other hand, all or a portion of the material in conduit 97 may be passed by conduit 99 to heat exchanger 101 and air cooler 103 before being passed to storage as a demetallized and decarbonized liquid product thereafter available for further treatment or use as desired.

A bottom fraction withdraw for column 61 by conduit 105 at a temperature of about 310° C. (590° F.) is passed in parallel flow arrangement through a high pressure stream generating heat exchanger 107 and through a crude oil feed heat exchanger 109 before being combined and recovered as a single stream of reduced temperature for passage through heat exchanger 11 also provided for generating some 150 psig steam indirectly. A portion of the bottoms fraction thus cooled is passed by conduit 113 directly to the main column 61 as quench fluid above the MRS product inlet 17. A portion of this material is diverted by conduit 19 for use directly as quench fluid of the MRS vapors in conduit 17 as discussed above. Still another portion of the cooled material withdrawn from exchanger 111 is passed by conduit 115 to a slurry settler drum 117. In slurry settler drum 117 a separation is made which permits withdrawal of a demetallized material by conduit 119 which is further cooled in heat exchanger 1221 before admixture with material in conduit 93 charged to heat exchanger 95. Heat exchanger 121 is also relied upon to produce 150 psig steam with heat exchanger 95 providing preheat to boiler feed water for ultimately producing 450 pound steam. Provision is made for charging the MRS feed (reduced crude containing feed) to a charge drum 123 by conduit 125 from which a bottoms fraction is withdrawn by conduit 127 and a lower boiling portion of the charge may be separated and withdraw in by conduit 129 in a particular embodiment which material is introduced to a lower portion of the main column 61 but above the MRS quenched product material in conduit 17 charged thereto. The higher boiling MRS hydrocarbon charge material recovered from drum 123 by conduit 127 is passed directly to the MRS riser reactor for demetallization and decarbonization as herein described or it may be diverted at least in part through the slurry settler 117 and withdrawn from the bottom thereof by conduit 131 before being charged as feed to the MRS riser reactor with solid particulate recovered from slurry settler 117.

Figure 5:
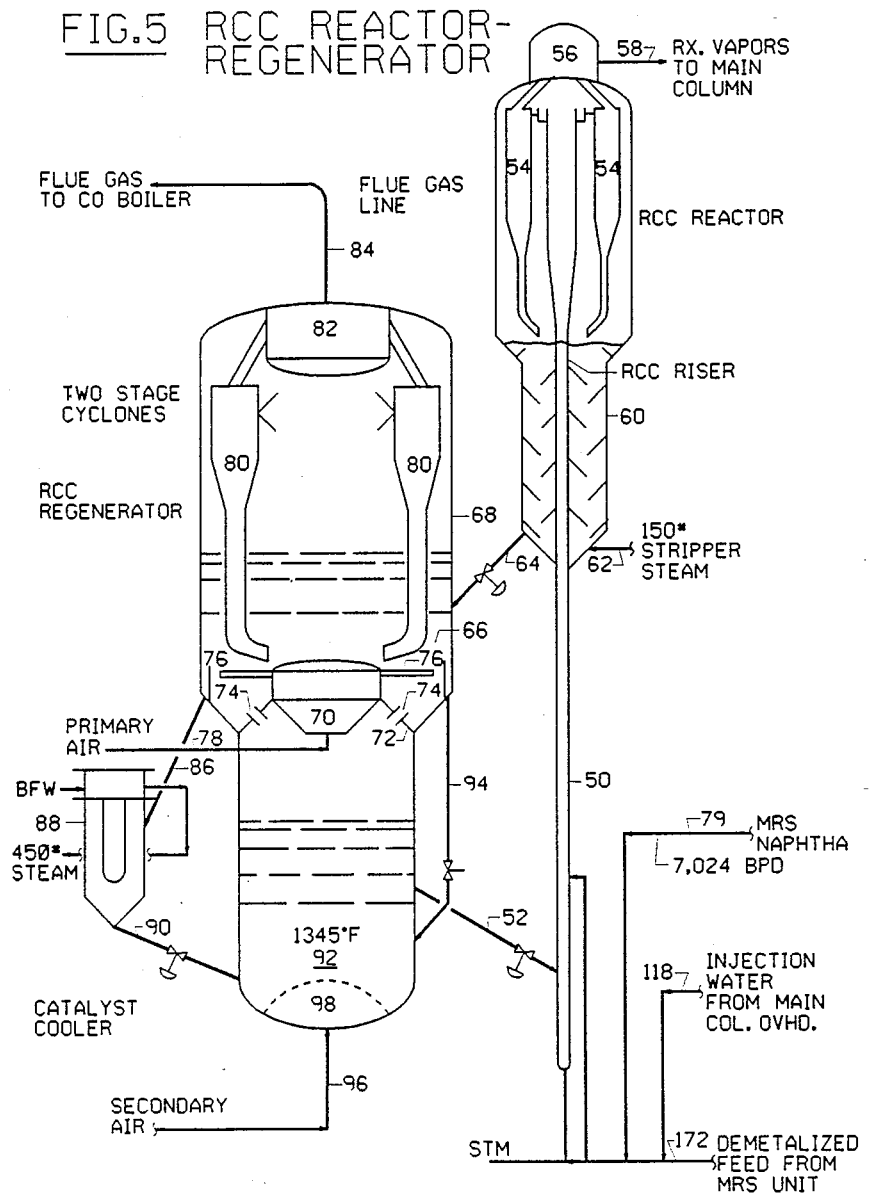

Referring now to FIG. 5 there is shown an arrangement of vessels with interconnecting conduits comprising a fluid catalyst riser reactor-regenerator system herein referred to as the RCC unit and relied upon to process partially demetallized and decarbonized feed materials obtained from the MRS thermal visbreaking unit. As mentioned above, the residual metals in the RCC feed on the basis of (Ni+V) nickel plus vanadium or nickel equivalent charged to the RCC riser reactor will be considerably reduced by the MRS solid contacting unit and usually will be less than about 100 ppm and preferably not above about 50 ppm Ni+V. The operation of the RCC system is similar in many respects to an (FCC) fluid catalyst cracking system but is more critically and selectively controlled with respect to catalyst composition, and catalyst regeneration conditions in order to catalytically process thermal product of high boiling residual oils conversion which have been partially demetallized and decoked as herein provided. Operation of the (RCC) fluid catalyst cracking unit is critical with respect to heat balance and feed conversion selectivity since relatively substantial amounts of carbonaceous material deposits are laid down on the catalyst depending on the feed charged along with accumulated metal deposits on the circulated catalyst. Undesired conversion of charged oil feed is potentially eminent so that product selectivity achieved may be undesirable or altered when the catalytic conversion balance of the operation is permitted to vary from a relatively restricted range of operating conditions into less than an efficient and economic operation. It is desirable if not required to restrict the temperature operation of a two stage regeneration operation of the RCC system so as to restrain the amount of heat transferred to the RCC riser cracking zone by the catalyst and yet reduce residual coke on regenerated catalyst to a desired low level less than 0.1 wt %.

The catalyst regeneration operation of this invention is considered unique in maintaining desired temperature control in combination with generating CO rich flue gas subsequently used to advantage in the process to generated relatively low and high pressure steam in conjunction with providing a mass of active zeolite containing catalyst particles of a selected conversion temperature and retained residual coke having an effect on metal deposits on the catalyst particles. More importantly however is the identification of operating conditions utilized in the hydrocarbon conversion riser reactor zone which permits one to process visbroken products of thermally treated heavy crudes which are partially demetallized and decoked as herein identified. The operating conditions are selected to particularly increase the yield of desired liquid fuel products comprising gasoline, light and heavy cycle oils as well as some gasiform materials readily converted to useful fuel products including producers gas, gasoline boiling range product materials such as by alkylation, isomerization, polymerization or a combination thereof. In the RCC system the temperature of the conversion product vapors obtained is preferably restricted to within the range of about 510° C. (950° F.) up to about 649° C. (1200° F.) and more particularly restricted not to exceed about 593° C. (1100°). The use of water injection and steam dispersion is relied upon in substantial measure for temperature control, feed atomized dispersion and in achieving a suitably high velocity suspension of catalyst particles and hydrocarbon feed in the riser cracking reaction to satisfy a hydrocarbon conversion time frame less than about 4 seconds, more usually less than about 3 seconds, and preferably in the range of 0.5 to 2 seconds. Thus, it is important to achieve rapid dispersed phase and atomized contact of feed with catalyst particles in the riser and separation of hydrocarbon product vapors from catalyst substantially immediately upon discharge from the riser reactor conversion zone. In order to accomplish the above identified selective operation the riser reactor is designed to achieve relatively high velocity (about 50 ft./second) mixing of hot catalyst particles with fluidizing gaseous material and with charged partially demetallized high boiling feed material in a lower restricted diameter portion of the riser reactor section and thereafter limiting the velocity of the suspension at the riser outlet to a discharge velocity not exceeding about 80 or 90 feet per second. This combination of operating conditions is accomplished by increasing the diameter of the riser in an upper section thereof. In a particularly preferred arrangement the initially formed suspension is at a velocity of about 45-60 feet per second and the velocity of the suspension discharged from the open upper end of the riser reactor is about 86 feet per second after passing through an expanding transition section between the smaller and larger diameter sections of the riser. The discharge temperature is maintained below about 552° C. (1025° F.) but above about 524° C. (975° F.) in a specific embodiment.

FIG. 5 shows introducing a mixture of the demetallized feed obtained from the MRS unit, MRS naphtha and water obtained from the main column overhead drum herein discussed to a bottom or upper portion of riser reactor 50 as desired. Steam, or other suitable lift gas, may be charged separately to the bottom of the riser and with demetallized feed charged to assist with obtaining more complete atomized and vaporized dispersion of the heavy oil feed in contact with the regenerated hot catalyst particles charged to the bottom portion of the riser by conduit 52. It is thus contemplated forming an upflowing suspension of steam and catalyst with or without charged naphtha in a bottom portion of the riser and charging the demetallized and decarbonized thermally converted oil feed with additional viscosity reducing quantities of water and/or steam to a downstream portion of the riser. It is further contemplated charging the oil feed admixed with atomizing diluent such as steam and/or naphtha through a plurality of horizontally disposed oil feed atomizing feed devices not shown penetrating the riser wall to achieve more intimate contact of the high boiling feed with upflowing hot regenerated fluidized catalyst particles and form an upflowing suspension thereof undergoing conversion within the time and temperature conversion frame herein desired. The concentration of catalyst particles in the upflowing suspension in the riser is selected to be within the range of about 2 to 15 lbs. per cubic ft. and a sufficient catalyst to oil ratio of the feed to achieve desired catalytic conversion thereof.

Following traverse of the riser zone 50 the suspension is discharged from the top open end of the riser under ballistic separation conditions and passing gasiform product or vaporous material comprising hydrocarbon vapors with some entrained fine catalyst particles through a plurality of parallel arranged cyclone separators 54 generally comprising one or more stages of cyclone separation positioned about the annular zone about the upper end of the riser. However, two cyclone separators in parallel and fed by a common passageway may also be employed. Separated product vapors or gasiform material comprising hydrocarbon conversion products are collected in a plenum chamber 56 and withdrawn therefrom by conduit 58 communication with a product recovery section represented by FIG. 7 and discussed below.

Particularly preferred devices for gas-solid separation in both the MRS and the RCC units are shown in U.S. Ser. No. 753,231 filed Dec. 20, 1976 by Myers, Walters, and Cottage and U.S. Ser. No. 06/263,394 to Walters, Benslay, and Barger now U.S. Pat. No. 4,390,503 and U.S. Pat. Nos. 4,066,533 and 4,070,159.

Catalyst particles separated from vaporous products of hydrocarbon conversion are collected and passed downwardly through a stripping zone 60 countercurrent to upflowing stripping gas such as steam introduced by conduit 62. The temperature of the RCC stripping operation is generally maintained within the range of about 482° C. (900° F.) to about 566° C. (1050° F.). The catalyst stripped of entrained vapors is passed by a standpipe or conduit 64 to a bed of catalyst 66 in a first stage of catalyst regeneration affected in the upper portion of a two stage catalyst regeneration vessel 68.

Regeneration vessel 68 is unique in several respects. That is, the upper portion thereof is of larger diameter than a bottom vessel portion and separated from one another by gas flow through means supporting a centrally located air distributor plenum chamber 70. The gas flow through means comprises an annular baffle 72 provided with upward flue gas flow through passageways 74. A plurality of radiating arm means 76 are provided with plenum 70 for introducing additional regeneration gas to a lower portion of catalyst bed 66 in the first stage of regeneration. Regeneration air in a specific embodiment amounting to about 75% of that required to achieve desired hydrocarbonaceous material removal by burning and thus desired regeneration of the catalyst is introduced to plenum chamber 70 by conduit 78. The regeneration gas such as air or oxygen modified gases may be preheated by means not shown to a desired elevated temperature within the range of about 93° C. (200° F.) to 204° C. (400° F.). The catalyst introduced to bed 66 by conduit 64 comprises hydrocarbonaceous deposits of the riser hydrocarbon conversion operation and thus contain some hydrogen. In this first stage of catalyst regeneration operation, the regeneration temperature is kept in the range of about 649° C. (1200° F.) up to about 760° C. (1400° F.) under combustion supporting conditions of carbonaceous deposits sufficient to effect partial removal of carbonaceous deposits and particularly produce CO rich flue gases. The CO rich flue gases comprising $CO_2$, sulfur oxides, nitrogen and water vapor which pass through a combination of sequential and parallel arranged cyclone separators and which may comprise a combination of at least two cyclones in series and represented generally by cyclones 80 wherein entrained catalyst particles are separated from flue gas and returned by the cyclone dipleg to the catalyst bed 66. Flue gas separated from catalyst particles is passed to a plenum changer 82 for withdrawal therefrom by conduit 84 as a CO rich flue gas for use as discussed below.

The partially regenerated catalyst of bed 66 is passed to a second stage of catalyst regeneration below the first stage through an external standpipe 86 provided with a catalyst cooler 88 wherein high pressure 450 pound steam is generated. The catalyst partially cooled in steam boiler 88 and only partially regenerated is then passed by conduit 90 to a fluid bed of catalyst 92 in the lower portion of the regeneration vessel 68 and comprising the second stage of catalyst regeneration. Standpipe 94 is provided as a secondary external standpipe for transfer of catalyst from bed 66 directly to bed 92 without cooling thereof. Standpipe 86 is the primary route of catalyst transfer from bed 66 to bed 92. The use of these transfer standpipes is to transfer partially regenerated catalyst and maintain temperature control in the lower regeneration stage for residual carbon burn at a temperature within the range of 718° C. (1325° F.) up to about 815° C. (1500° F.). Regeneration of catalyst in bed 92 is effected at a temperature preferably restricted within the range of 649° C. (1200° F.) up to about 760° C. (1400° F.) and in the presence of an oxygen containing gas sufficient to achieve substantial burning of residual coke on the partially regenerated catalyst obtained from bed 66. In one specific embodiment the amount of air or oxygen modified gas employed in the second stage of catalyst regeneration introduced by conduit 96 beneath a distribution grid 98 or by other suitable means is only about 25% of that required to accomplish desired catalyst regeneration and produce a $CO_2$ rich flue gas for passage upwardly into the first stage of regeneration. That is, all of the flue gas from the second stage of regeneration pass through openings 74 in baffle member 72 separating the upper regenerator from the lower regenerator. Thus the hot flue gases of the second stage operation comprising CO, $CO_2$ and any unreacted oxygen containing gas pass without cooling into the bottom portion of bed 66 thereby contributing heat to catalyst bed 66 whereby the combustion of carbonaceous deposits is implemented. Regenerated catalyst of relatively low residual coke below about 0.25 weight percent and more usually reduced to about 0.1 or less wt % and at a temperature within the range of 704° C. (1300° F.) to 815° C. (1500° F.) is withdrawn from catalyst bed 92 for passage by conduit (standpipe) 52 to a lower bottom portion of riser 50 and reuse therein as herein before discussed.

Figure 3:
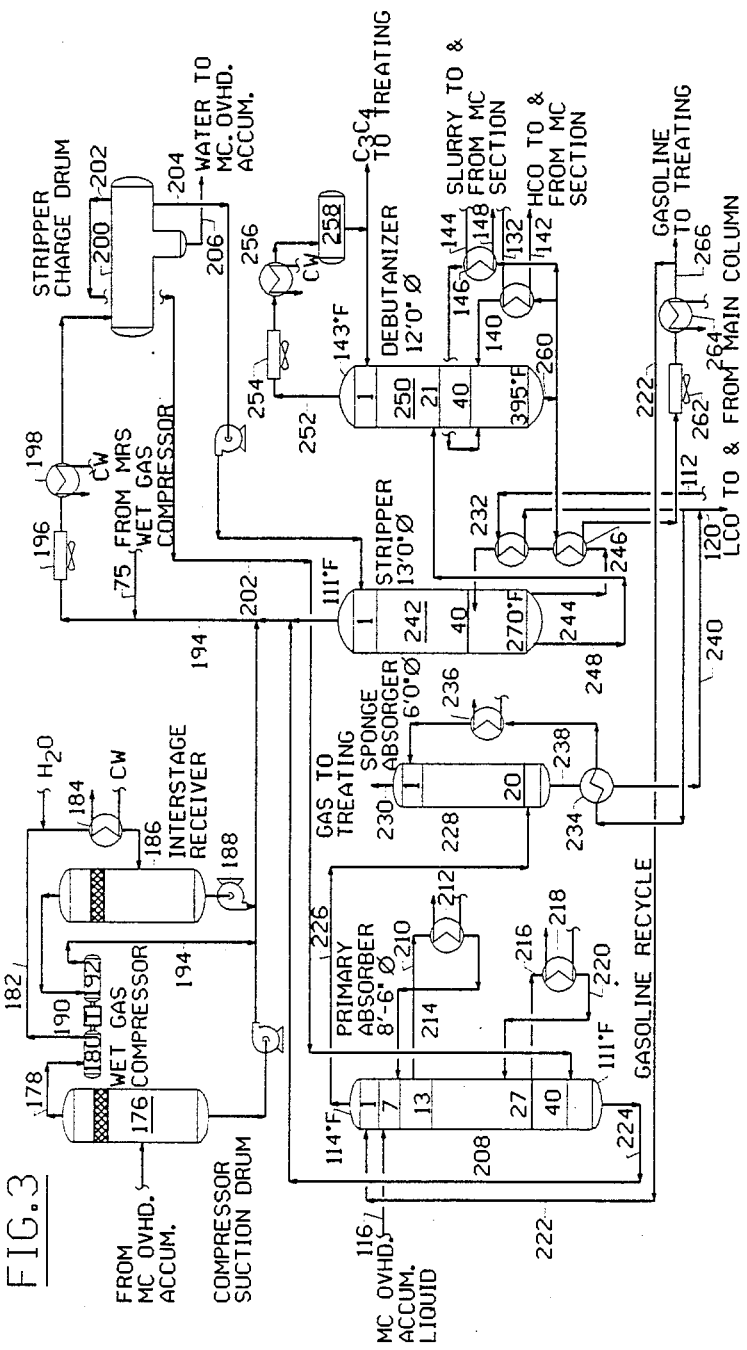
FIG. 3 identifies a combination of processing steps for separating the gaseous product of inert solid visbreaking and catalytic cracking obtained by the arrangement of FIG. 4 and 5.

The product recovery section of the RCC unit is shown in FIG. 7. Referring now to FIG. 7, vaporous hydrocarbon products and diluent materials of the RCC catalystic conversion operation is withdrawn by conduit 58 (FIG. 5) are passed to a bottom portion of main column 100 for separation by fractionation as hereinafter briefly discussed. A vaporous or gasiform material comprising hydrocarbon vapors and diluent is withdrawn from the top of column 100 by conduit 102 for passage through air cooler 104, and heat exchanger 106 to drum 108. In drum 108, maintained at a temperature sufficient to recover 204° C. (400° F.) material by conduit 110, a separation is made which permits the recovery of equilibrium hydrocarbon vapors comprising 204° C. (400° F.) minus material by conduit 110, a gasoline boiling range product material is also recovered by conduit 112, a portion of which is recycled as reflux to column 100 by conduit 114 and the remaining portion being passed by conduit 116 to a primary absorber column of the RCC gas concentration section of FIG. 3 discussed below. Sour water comprising sulfur compounds is recovered from drum 108 by conduit 118 for distribution to a sour water stripper not shown or recycled by conduit 118 to the RCC riser reactor as discussed above with respect to FIG. 5. A light cycle oil (LCO) recovered in the system of FIG. 3 is charged by conduit 120 to an upper portion of column 100 above a grid packing section shown. A light cycle oil is withdrawn from a lower portion of column 100 by conduit 122. A portion of the withdrawn LCO may be recycled directly to a lower section of the column with the major portion thereof being passed directly to the system of FIG. 3 discussed below. A portion of the LCO withdrawn by conduit 122 is passed by conduit 124 to a LCO stripper 126. Material stripped from the light cycle oil with steam in zone 126 is returned to the main column by conduit 128. Stripped LCO is withdrawn from stripper 126 by conduit 130 for passage through heat exchanger 132, air cooler 134 and cooler 136 before passage to storage. A portion of this material may be used as flushing fluid in pumps, instruments and other process equipment of the combination process.

A heavy cycle oil (HCO) is recovered from column 100 by conduit 138 for passage to a heat exchanger 140 in the system of FIG. 3 whereby cooling of the HCO is accomplished before recycle thereof to an upper portion of main column 100 by conduit 142. A bottoms fraction is recovered from the main column 100 by conduit 144 for passage to heat exchange means 146 associated with the debutanizer tower of FIG. 3 discussed below. This material following cooling thereof by heat exchange means 146 is recycled to the main column of FIG. 7 by conduit 148. Provision is also made for passing a portion of the high boiling material in conduit 144 through a steam boiler 150 by conduit 152 and heat exchange cooler 154. The high boiling material thus cooled is combined with slurry material in conduit 148 for recycle to the lower portion of main column 100 to maintain the temperature in a bottom portion of the column at least about 343° C. (650° F.). A portion of the high boiling material in conduit 144 may also be passed by conduit 156 to slurry settler 158 from which a clarified oil is recovered by conduit 160 and thereafter cooled by heat exchanger 162 and 164 before being passed to storage for other use as desired. The clarified oil thus recovered is suitable for use in heavy fuel oil blending operations or it may be recycled to the RCC riser for further conversion thereof.

The reduced crude containing feed decarbonized and demetallized by the MRS system of FIG. 4 and recovered by conduit 97 is passed to charge drum 168 of FIG. 7 wherein depending on temperature conditions maintained, a separation may or may not be made before passing the RCC charge material all or in part thereof to the slurry settler 158 by conduit 170. A portion of the RCC charge material may also be passed through exchanger 154 before being combined with the slurry settler bottoms and passed as feed to the RCC riser reactor by conduit 172. Low boiling component material in the feed charged to drum 168 may be separated and passed overhead by conduit 174 to the main column 100. On the other hand it is contemplated recovering a relatively heavy cycle oil (HCO) type material from the main column by conduit 174 for admixture in drum 168 with the feed charge material introduced by conduit 97.

One of the more important aspects of the combination operation of this invention with respect to processing efficiency and energy conservation resides in the gas concentration section represented by FIG. 3. In this arrangement of processing steps, equilibrium hydrocarbon vaporous material recovered from the RCC main column 100 overhead drum 108 by conduit 110 is charged at a temperature of about 38° C. (100° F.) and a pressure of about 5 psig to a compressor suction drum 176 provided with a demister pad in an upper portion thereof. In normal operation, no liquid product is separated in drum 176 maintained at a low pressure so that the total hydrocarbon vapor stream charged to drum 176 and comprising $C_2$ plus material and gasoline component material boiling up to about 204° C. (400° F.) is removed overhead by conduit 178 for passage to a first stage of compression 180 to raise the pressure of this equilibrium stream up to about 75 psig. The compressed material in conduit 182 is partially cooled by the direct addition of water thereto followed by further cooling in heat exchanger 184 before discharge into drum 186. A separation is made in drum 186 to provide a liquid stream withdrawn by conduit 188 and a vaporous stream withdrawn by conduit 190. The vaporous material is further compressed in compressor 192 and recovered therefrom at an elevated pressure by conduit 194 for passage to drum 200 downstream thereof at a pressure in the range of about 210–215 psig and a temperature of about 16° C. (60° F.). The compressed vaporous material in conduit 194 is mixed with liquid in conduit 188 provided with a pump not shown for passage to air cooler 196 and heat exchanger 198 before entering drum 200 briefly referred to above. Vaporous material from the MRS wet gas compressor in conduit 75 is added to the vaporous material in conduit 194 before passing to air cooler 196.

In drum 200 an equilibrium separation is made at a temperature of about 16° C. (60° F.) and a pressure of about 210–215 psig to recover a hydrocarbon vaporous material boiling below 204° C. (400° F.) withdrawn by conduit 202 from a liquid hydrocarbon product recovered by conduit 204 and water recovered by conduit 206. The vaporous material in conduit 202 is passed to the lower bottom portion of a primary absorber column 208. Liquid material recovered from the main column 100 overhead drum 108 by conduit 116 (FIG. 7) is charged to an upper portion of absorber column 208. A primary function of absorber column 208 maintained at a top temperature of 46° C. (114° F.) and a bottom temperature of 44° C. (111° F.) is to effect a separation of $C_3+$ material from lower boiling gaseous material comprising ethane withdrawn by conduit 226. To assist in this separation effort is a first pump around stream is withdrawn from an upper portion of the absorber column by conduit 210, cooled in cooler or heat exchanger 202 and returned to the column by conduit 214. A second pump around stream is withdrawn from a lower portion of the column by conduit 216, cooled in cooler or heat exchanger 218 and returned by conduit 220 to the column. The efficiency of absorber column 208 is maintained high by charging gasoline product material recovered as hereinafter discussed by conduit 222 to an upper top portion of the tower 208. This method of operating the primary absorber has been found to considerably improve the separation and recovery of $C_2$ and lower boiling materials from more desirable higher boiling product material separated in the process. The absorber bottoms is recovered by conduit 224 and passed to air cooler 196 along with material in conduit 194 and that withdrawn from the top of stripper 242. The gaseous overhead material of primary absorber column 208 is withdrawn by conduit 226 for passage to a sponge oil absorber tower 228. A light cycle oil (LCO) product recovered from the main column fractionator FIG. 7 by conduit 112 and cooled as hereinafter discussed is employed as sponge oil in column 228 to effect recovery of $C_3+$ constituents from $C_2$ minus components in the gaseous stream of conduit 226 comprising ethane and hydrogen. The $C_2$ minus product is withdrawn by conduit 230. The sponge oil (LCO) obtained from the main column and introduced to FIG. 3 by conduit 112 is passed through cooler 232, heat exchange 234 and cooler 236 adjacent stripper 242 before discharge in an upper portion of sponge absorber column 228. The sponge oil enriched with $C_3+$ components is withdrawn by conduit 238 from absorber 228 for passage through heat exchanger 234 and recovery therefrom by conduit 240. This material recovered by conduit 240 is returned to the main column 100 of FIG. 7 by conduit 120 for introduction to a top portion of column 100.

The liquid hydrocarbon product recovered by conduit 204 from stripper charge drum 200 FIG. 3 is pumped for discharge in the upper top portion of stripper column 242. A material fraction boiling above about 132° C. (270° F.) is withdrawn from the bottom of stripper 242 by conduit 248 for passage to a debutanizer tower 250. Debutanizer tower 250 is maintained at a top temperature of about 62° C. (143° F.) and a bottom temperature of about 201° C. (394° F.) under pressure conditions promoting the separation of $C_3+$ material charged by conduit 248 to be separated into a $C_3$–$C_4$ rich fraction removed from the top of the tower by conduit 252 and passage thereof through air cooler 254, cooler 256 to drum 258. Separated $C_3$–$C_4$ product material is recovered from drum 258 for further treating as desired such as alkylation, polymerization and izomerization with a portion thereof recycled to an upper portion of tower 250, as reflux. A $C_5+$ gasoline fraction is recovered from the bottom of tower 250 by conduit 260. A portion of this $C_5+$ gasoline fraction is passed to heat exchanger 246, then to air cooler 262, heat exchanger 264 and recovery therefrom by conduit 266. A portion of this recovered gasoline fraction is recycled by conduit 222 to the top of primary absorber tower 208 as discussed above to improve separation and recovery between ethane and lower boiling material from higher boiling $C_3+$ hydrocarbons. Another portion of the $C_5+$ gasoline recovered by conduit 260 from debutanizer 250 is separated into parallel streams for passage through exchangers 140 and 146 to raise the temperature thereof before recycle to a lower portion of debutanizer tower 250.

Figure 2:
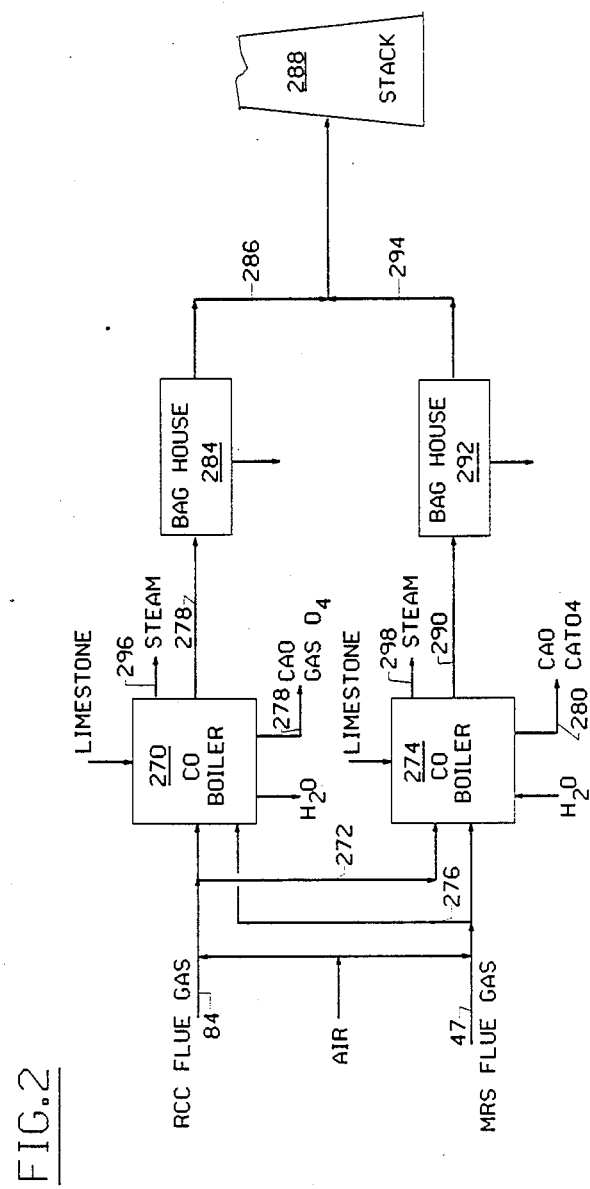
FIG. 2 is a block flow arrangement of parallel CO boilers comprising particles of limestone for converting CO rich flue gases comprising sulfur oxides recovered from regenerating inert and catalytic solids.

An important aspect of the overall processing combination of this invention is concerned with the generation of CO rich flue gases, and use of the CO rich flue to generate high and low pressure steam used in the process which is distributed as briefly discussed herein, thus contributing to significant savings in energy requirements of the process. FIG. 2 is particularly directed to an apparatus arrangement for processing and utilization of CO rich flue gas obtained from the regenerator vessels of the MRS Unit and the RCC unit discussed in more detail above. A further significant aspect of the operation of FIG. 2 is concerned with the conversion of sulfur oxides found in the regeneration flue gas so that combustion product $CO_2$ rich flue gas indirectly cooler in CO boilers may be vented directly to the atmosphere without harmful effect. In the arrangement of FIG. 2, CO rich flue gas from the RCC regenerator of FIG. 5 withdrawn by conduit 84 is charged in part to CO boiler 270 and by conduit 272 to CO boiler 274. Regeneration flue gas recovered from the MRS regenerator by conduit 47 is charged in part to CO boiler 274 and may by conduit 276 to CO boiler 270. This parallel flow arrangement of CO rich flue gas to the parallel arranged CO boilers in admixture with added combustion supporting gas permits operating one without the other during shut down for any particular reason. The CO boilers contemplated for use comprise fluid beds of limestone particles about indirect heat exchange means for directly contacting limestone particulate with flue gas combustion products of CO combustion with air in indirect heat exchange with boiler feed water charged to a given CO boiler arrangement for generation of relatively high pressure 450 lb. steam recovered therefrom by means provided. In this operating arrangement calcium oxide and calcium sulfate are formed during direct contact between the fluid bed of limestone particulate and combustion product gases and separately recovered so that the flue gas combustion products separated from sulfur contaminant may be discharged directly to the atmosphere through a stack 288 provided. The fluidized limestone thus converted in CO boiler 270 and 274 is recovered by conduit means 278 and by conduit means 280 from CO boiler 274. Combustion products of CO boiler 270 are passed by conduit 282 to a bag house 284 for recovery of fines therefrom before passing by conduit 286 to stack 288 and release to the atmosphere.

Combustion product gases of CO boiler 274 are passed by conduit 290 to bag house 292 for removal of entrained fines before passage by conduit 294 to stack 288 either separately or admixed with gases in conduit 286. High pressure steam is recovered from zone 270 by conduit 296 and from zone 274 by conduit 298.

An important aspect of the combination operation of this invention is concerned with the utilization of generated steam by the process and heat exchange arrangements provided to accomplish transfer, utilization and recovery of such combustion heat energy by the combination operation. That is the high pressure steam generated by the CO boiler arrangement above discussed is relied upon for example to drive turbines for the air blowers for the MRS and RCC regenerators above discussed, there being two such air blower arrangements for the MRS regenerator because of the regeneration air requirements thereof. This generated high pressure steam is also utilized to drive air blower providing combustion air to the CO boilers, as well as to drive turbines for the RCC wet gas compressors 180 and 192 and the MRS wet gas compressor 73. The RCC slurry steam generator 150 of FIG. 7 provides 450 lbs. steam as does the MRS steam drum 107 of FIG. 6. This generated high pressure steam is utilized to drive turbines for the MRS charge pump (not shown), the RCC charge pump (not shown), the RCC slurry pumps (not shown) and a boiler feed water pump (not shown). The RCC slurry steam generator 154 FIG. 7 is relied upon to generate 150 pound steam as does the MRS steam drum 111 of FIG. 6. This 150 pound steam is supplemented by the recovery of 150 pound steam from the 450 pound blow down of the steam generators. The 150 pound (psi) steam thus generated is used to drive lube oil pumps (not shown) and is also used as RCC reactor stripping steam, LCO stripper steam above discussed and for condenser vacuum jets required in the process but not discussed. Condensate recovered from the above briefly discussed steam utilization is charged as boiler feed water to the various heat exchangers identified in the drawings above specifically discussed.

A further important aspect of the combination operation of this invention above discussed is concerned with the selected severity of thermal conversion relied upon in the MRS operation employing relatively inert fluidizable solids to provide a suitable decarbonized and demetallized feed material to be subsequently converted with a crystalline zeolite containing catalyst in the downstream RCC catalytic conversion operation. That is, the operating techniques of this combination of operations are concerned with effecting the catalytic conversion of a thermally prepared feed material comprising an acceptable level of metal contaminants up to but preferably less than about 100 ppm Ni+V with a cracking catalyst comprising a catalytically active crystalline zeolite of relatively large pore dimensions as provided by faujasite type crystalline zeolites in admixture with a siliceous sorbent matrix material. The catalyst used in this operation comprises a higher contaminating metals level than previously thought usable in more conventional fluid cracking operations. In this operating combination, tailoring of the operating conditions employed in the MRS thermal visbreaking operating and feed preparation unit are selected to provide a thermally processed portion of crude oil of reduced metal contaminant and carbon forming compounds as feed for a downstream catalytic conversion step as herein discussed. This interrelated tailoring of thermal operating conditions for high boiling residual oil feed preparation and utilization thereof are adjusted dependent upon the composition of the high boiling feed to be processed, its initial boiling point and the level of metal contaminants and Conradson carbon producing components upon pyrolysis thereof. In this connection, whatever high boiling portion of a topped crude is to be upgraded as herein provided, thermal preparation of the feed is accomplished under conditions substantially effecting demetallization and decarbonizing of the feed before being charged to the RCC catalytic cracking operation. It is also desirable within this processing arrangement to substantially limit the production of thermally produced naphtha even though such thermal naphtha can be upgraded in the zeolite cracking operation along with thermally decarbonized and demetallized high boiling feed charged thereto as above discussed.

It is further recognized that the thermal conversion or visbreaking operation when effected in the absence of added molecular hydrogen provides a variety of unusual operating parameters in that the inert solid sorbent particulate material may be used to accumulate high levels of metal contaminants in preparation of residual oil feed suitable for processing in a downstream zeolite catalyst cracking operation. In this connection and operating environment the downstream zeolite cracking operation may circulate a catalyst composition comprising in excess of 3000 ppm Ni+V metal contaminants. The efficiency of the separate operations above identified are of a high order of magnitude and synergistically related to their mutual benefit. The recovery of high pressure steam from the combined flue gases of each regeneration operation of itself provides considerable process advantage in supplying the energy requirements of the combination operation. More importantly is the economic advantage and efficiency of operation attached to the combined recovery section of FIG. 3 referred to as the gas concentration section for processing the wet gas streams recovered from each cracking operation. This is done in conjunction with also separating the main column 100 over head accumulated liquid of the RCC product recovery section of FIG. 7. In addition to the above broadly stated advantages of the combination operation herein described, a selective thermal visbreaking of metals containing heavy residual oil feed material is accomplished in a riser conversion zone provided with a plurality of vertically spaced apart feed inlet means to achieve a selected hydrocarbon residence time within the riser of about 0.5 seconds, about 1.2 seconds or about 1.5 seconds as desired when passing a suspension of solids in gasflow material upwardly through the riser at a velocity selected to inhibit naphtha production. On the other hand the riser reactor provided for the zeolite catalyst conversion operation relies upon a selection of velocity conditions and hydrocarbon residence time promoting conversion of the feed to desired products. Suspension velocities conditions in the range of 50 to 200 feet per second are contemplated. A velocity is selected in a bottom portion of the riser which is suitable in an expanded upper section of the riser to provide a suspension discharge velocity generally not more than about 85 feet per second. In this operating environment of the zeolite catalyst cracking step, the formed vaporous hydrocarbon residence time in contact with catalyst and substantial amounts of diluent materials is restricted not to exceed about 4 seconds and more usually is retained within the range of 0.5 to 2 or 3 seconds.

It is thus evident from the discussion above presented that the combination operation of this invention provides an attractive arrangement of operating parameters for upgrading hydrocarbon feed comprising more of the crude oil boiling above 552° C. (1025° F.). It provides for the use of demetallizing and decarbonizing solid particulate of fluidizable particle size both catalytic and noncatalytic under conditions of relatively high metals loading thereby reducing solids inventory replacement. Of particular interest is the realization that such solid particulate can be used with higher levels of deposited metal contaminants than previously recognized for preparing and processing high boiling residual portions of crude oils initially comprising up to 100 ppm No+V or more of metal contaminants to obtain more desirable liquid fuel boiling range products.

Having thus generally described the combination operation of the present invention and discussed specific embodiments in support thereof, it is to be understood that no undue restrictions are to be imposed by reason thereof except as provided by the following claims.

What is claimed is:

1. A method for upgrading high boiling residual portions of crude oils comprising metal contaminants, porphyrins, asphaltenes and high molecular weight multi-ring hydrocarbon material, which method comprises:

A. charging a high boiling residual portion of crude oil admixed with diluent in contact with suspended upflowing substantially inert fluidizable solids particulate material at an elevated thermal visbreaking temperature in a riser contact zone for a time sufficient to recover therefrom a vaporous hydrocarbon product higher boiling than gasoline partially decarbonized and demetallized to a lower contaminating metals level, B. quenching said vaporous product of thermal visbreaking below its dew point after separation from solids, C. charging quenched thermally modified high boiling hydrocarbon product comprising metal contaminants in admixture with thermally produced naphtha in contact with a crystalline zeolite cracking catalyst maintained under cracking conditions for a hydrocarbon residence time in a riser cracking zone in the range of 0.5 to 3 second providing a riser outlet product temperature within the range of 510° C. (950° F.) to 593° C. (1100° F.), D. recovering a hydrocarbon conversion product of said zeolite cracking operation comprising gasoline, lower and higher boiling product components separated from catalyst particles, E. separating a combined $C_4$ minus wet gas product stream of said visbreaking and zeolite catalyst cracking operating to recover a $C_3$-$C_4$ rich fraction separately from a $C_2$ minus dry gas product fraction, and F. regenerating said crystalline zeolite containing catalyst comprising carbonaceous deposits of said cracking operating in a sequence of separate regeneration zones provided with catalyst cooling transferred between zones under conditions to produce a CO rich flue as and high temperature catalyst particles suitable for recycle to said zeolite cracking operation; wherein vaporous hydrocarbon products of each said inert solids and catalyst contacting steps comprise naphtha and lower boiling materials which are processed together under conditions to effect the recovery of a $C_3$ minus dry gas stream from a $C_3$-$C_4$ rich gaseous product stream and a naphtha boiling range product separated from a light cycle oil product is used to effect separation of $C_2$ minus products from a $C_2$-$C_4$ rich product stream.

2. The method of claim 1 wherein zeolite catalytic cracking of the thermally modified hydrocarbon product of visbreaking in the presence of diluent gaseous materials is accomplished in a riser contact zone at a velocity providing a hydrocarbon residence time in the riser reactor less than 2 seconds.

3. A method for upgrading high boiling residual portions of crude oils comprising metal contaminants, porphyrins, asphaltenes and high molecular weight multi-ring hydrocarbon material, which method comprises:
   A. charging a high boiling residual portion of crude oil admixed with diluent in contact with suspended upflowing substantially inert fluidizable solids particulate material at an elevated thermal visbreaking temperature in a riser contact zone for a time sufficient to recover therefrom a vaporous hydrocarbon product higher boiling than gasoline partially decarbonized and demetallized to a lower contaminating metals level,
   B. quenching said vaporous product of thermal visbreaking below its dew point after separation from solids,
   C. charging quenched thermally modified high boiling hydrocarbon product comprising metal contaminants in admixture with thermally produced naphtha in contact with a crystalline zeolite cracking catalyst maintained under cracking conditions for a hydrocarbon residence time in a riser cracking zone in the range of 0.5 to 3 second providing a riser outlet product temperature within the range of 510° C. (950° F.) to 593° C. (1100° F.),
   D. recovering a hydrocarbon conversion product of said zeolite cracking operation comprising gasoline, lower and higher boiling product components separated from catalyst particles,
   E. separating a combined $C_4$ minus wet gas product stream of said visbreaking and zeolite catalyst cracking operation to recover a $C_3$-$C_4$ rich fraction separately from a $C_2$ minus dry gas product fraction, and
   F. regenerating said crystalline zeolite containing catalyst comprising carbonaceous deposits of said cracking operating in a sequence of separate regeneration zones provided with catalyst cooling transferred between zones under conditions to produce a CO rich flue gas and high temperature catalyst particles suitable for recycle to said zeolite cracking operation; wherein a CO combustion zone is provided for indirectly generating high pressure steam from regeneration flue gases in the presence of a fluid bed of limestone particles about steam generating indirect heat exchange zone for removing sulfur from the CO combustion product gases before venting to the atmosphere.

4. The method of claim 1 wherein regeneration of inert solid particulates is initially accomplished in an upflowing fluid mass of solid particulate superimposed by an upflowing confined more dilute suspension of regenerated solid particles in flue gas products of combustion, the upwardly flowing confined suspension is separated by momentum differential upon discharge therefrom to recover flue gas from regenerated solid particles, a portion of the regenerated solid particles separated from the flue gas is passed to a lower portion of said upflowing fluid mass of particles by a standpipe provided with an indirect heat exchange zone therein for generating steam and effect partial cooling of the regenerated solid particles, and another portion of said collected regenerated solid particles collected at an elevated temperature is passed directly to said thermal visbreaking zone.

5. The method of claim 1 wherein the thermal visbreaking zone is a riser contacting zone provided with a plurality of vertically spaced apart oil feed inlets arranged to contact an upflowing suspension for a hydrocarbon residence contact time in the riser for one of about 0.5 seconds, about 1.2 seconds or about 1.5 seconds, depending upon the oil feed inlet is utilized.

6. The method of claim 1 wherein a vaporous product of thermal visbreaking separated from inert solids in a separation zone is quenched substantially immediately following withdrawal from said separation zone to restrict further thermal conversion thereof and before introduction thereof to a downstream main column fractionation zone of the product recovery section of the thermal visbreaking operation.

7. The method of claim 1 wherein regeneration of the zeolite cracking catalyst is accomplished in a two stage regeneration operation comprising dense fluid catalyst bed containing with oxygen containing regeneration gas in each stage thereof wherein hot product flue gas of the second stage catalyst regeneration operation pass upwardly into and through an upper dense fluid catalyst bed of a first stage of catalyst regeneration, said second stage of catalyst regeneration being accomplished at a temperature equal to, below, or higher than, said first stage of catalyst regeneration, retaining some residual coke on the catalyst recovered from the second stage of regeneration and recovering a CO rich flue gas from the first stage of catalyst regeneration.

8. The method of claim 4 wherein the standpipe with a heat exchange zone provides for the major flow of catalyst from the first regeneration zone to the bed of catalyst in the second regeneration zone and a second stream of hot catalyst from the first regeneration zone to the second regeneration zone when needed for temperature adjustment of the catalyst bed in the second regeneration zone.

9. The method of claim 4 wherein about 75 percent of the combustion air required to regenerate the catalyst is charged to a lower portion of the catalyst bed in the first regeneration zone and the remaining 25 percent of that required to satisfactory regenerate the catalyst is charged to the lower portion of the bed of catalyst in the second lower regeneration zone.

10. The method of claim 1 wherein catalytic cracking of the hydrocarbon product of thermal visbreaking is accomplished with a zeolite catalyst in a riser contact zone by introducing the hydrocarbon product of thermal visbreaking into an upflowing high velocity suspension of zeolite catalyst suspended in a diluent material and the suspension thus formed is velocity reduced by increasing the diameter of the riser contact zone in a downstream portion thereof.

11. The method of claim 3 wherein vaporous products of said thermal visbreaking are quenched below the product dew point immediately upon recovering from the visbreaking zone to restrict further thermal conversion thereof.

12. The method of claim 3 wherein a naphtha product of said thermal visbreaking is upgraded with said zeolite catalyst in a suspension prior to contact with said partially decarbonized and demetallized oil feed.

13. A method for upgrading a distress hydrocarbon stock selected from the group consisting of topped crudes, residual oils, resids, reduced crudes, other heavy hydrocarbon materials obtained from coal, oil, shale, tar sands, and combinations thereof, which method comprises:

A. forming a confined first upflowing suspension of relatively inert particular solids in a lift gas comprising a gaseous product of said method in a first riser contact zone at an elevated temperature, B. charging said distress hydrocarbon stock initially admixed with a water product obtained from said method into said first upflowing suspension under conditions providing a thermal visbreaking temperature and residence time sufficient to effect partial demetallizing and decarbonizing of said distress hydrocarbon stock and to produce a thermally-cracked hydrocarbon product stream comprising a first vaporous hydrocarbon product and coked particulate solids, said first riser contact zone being provided with a plurality of vertically spaced apart hydrocarbon feed inlet means to furnish the capability of varying said residence time of said distress hydrocarbon stock in said first riser contact zone, C. discharging said thermally-cracked hydrocarbon product from said first riser contact zone under ballistic momentum separation conditions to separate said first vaporous hydrocarbon product comprising partially demetallized and decarbonized hydrocarbon components from said coked particulate solids and to recover said first vaporous hydrocarbon product in an annular zone in open communication with a plurality of downstream cyclone separation zones for recovery of hydrocarbon vapors from entrained solid particulate fines, D. quenching said first vaporous hydrocarbon product to a temperature below its dew point immediately upon being separated from said coked particulate solids to restrict further thermal conversion thereof and to provide a quenched hydrocarbon product, E. recovering from said quenched hydrocarbon product separately a 221° C.-plus product, a first $C_4$-minus wet gas product, and any naphtha product of thermal visbreaking, F. forming in a second riser contact zone a second upflowing suspension of a zeolite cracking catalyst in a lift gas comprising a gas product of thermal cracking, a gas product of catalytic cracking, or a gas product of thermal and catalytic cracking, G. charging said 221° C.-plug product admixed with water and thermal naphtha obtained from said first riser contact zone into a downstream portion of said second upflowing suspension at a point restricting the hydrocarbon feed riser residence time to within the range of about 0.5 to about 2 seconds to obtain a catalytically-cracked hydrocarbon product stream comprising a second vaporous hydrocarbon product and spent catalyst particles containing carbonaceous deposits, said second riser contact zone being provided with a plurality of vertically spaced apart hydrocarbon feed inlet means to furnish the capability of varying the residence time of said 221° C.-plus product in said second riser contact zone, H. discharging said catalytically-cracked hydrocarbon product stream from said second riser contact zone under ballistic momentum separation conditions to separate said second vaporous hydrocarbon product comprising gasoline and light cycle oils from said spent catalyst particles and to recover said second vaporous hydrocarbon product in an annular zone in open communication with plurality of downstream cyclone separation zones for recovery of hydrocarbon vapors from entrained catalyst particulate fines, and recovering from said second vaporous hydrocarbon product separately a second $C_4$-minus wet gas product, said gasoline, and said light cycle oils, I. regenerating said coked particulate solids from said first riser contact zone in an upflowing fluid mass of particulate solids superimposed by an upflowing confined more dilute suspension of regenerated solid particles in a flue gas products of combustion, separating the upflowing confined more dilute suspension by ballistic momentum separation conditions into regenerated solid particles and flue gas products of combustion, passing a portion of said regenerated solid particles to a lower portion of said upflowing fluid mass of particulate solids via a standpipe provides with an indirect heat exchange zone therein for generating steam and effecting partial cooling of the regenerated solid particles passing therethrough and passing a second portion of regenerated solid particles directly to said first upflowing suspension, J. regenerating said spent catalyst particles from said second riser contact zone in a two-stage regeneration operation comprising a first stage located above a second stage, a dense fluid catalyst bed with oxygen-containing regeneration gas being present in each stage, passing hot product flue gas produced in said second stage upwardly into and through a dense fluid catalyst bed in said first stage, passing said spent catalyst particles into said first stage to contact said hot product flue gas produced in said second stage to provide partially regenerated catalyst particles and a CO-rich flue gas, passing said partially regenerated catalyst particles into said second stage where additional removal of carbonaceous deposits occurs to provide said hot product flue gas and catalyst particles retaining some residual coke, recovering said CO-rich flue gas from said first stage and said catalyst particles retaining some residual coke from said second stage, K. passing said catalyst particles retaining some residual coke to said second riser contact zone to form said upflowing suspension of a zeolite cracking catalyst in a lift gas, the temperature of said catalyst particles retaining some residual coke being sufficiently elevated to convert said 221° C.-plus product being passed to said second riser contact zone into said catalytically-cracked hydrocarbon product stream comprising gasoline and light cycle oils, L. generating indirectly steam from regeneration flue gases by passing said regeneration flue gases into a CO-combustion zone in the presence of one or more fluid beds of limestone particles about a steam generating indirect heat exchange zone, sulfur being removed from CO-combustion product gases prior to said CO-combustion product gases being vented to the atmosphere, M. combining said first $C_4$-minus wet gas product obtained from said first riser contact zone with second second $C_4$-minus wet gas product obtained from said second riser contact zone to form a combined $C_4$-minus wet gas product, and N. processing said combined $C_4$-minus wet gas product under conditions to effect the recovery of a $C_2$-minus dry gas stream from a $C_3$–$C_4$-rich gaseous product stream, a naphtha-boiling range product separated from said light cycle oil product being used to effect separation said $C_2$-minus dry gas stream from said $C_3$–$C_4$-rich gaseous product stream.

14. The method of claim 13 wherein inert solid particulate material separated from vaporous product of thermal visbreaking is regenerated as an upflowing suspension of higher particle concentration in a lower portion than an upper portion of a regeneration zone, the upflowing suspension is discharged from the upper end of the regeneration zone under ballistic momentum separation conditions whereby separated product flue gases are recovered in an annular zone in open communication with a plurality of downstream parallel arranged flow through cyclone separation zones for recovery of flue gases separated from entrained solid particulate fines, passing solid particle material thus separated and recovered to said visbreaking zone at an elevated temperature sufficient to effect thermal visbreaking of said residual portion of crude oil, and passing a portion of the regenerated solid particulate material thus recovered through a cooling zone and then to a bottom portion of the upflowing suspension in said regeneration zone.

15. The method of claim 13 wherein the zeolite cracking catalyst separated from vaporous product is stripped and then passed sequentially through two stages of dense fluid catalyst bed regeneration flowing generally countercurrent to combustion supporting oxygen containing regeneration gas, a portion of the catalyst partially regenerated in the first regeneration zone is partially cooled before passage to said dense fluid catalyst bed second regeneration zone for contact with combustion supporting oxygen containing gas, combustion product gases of said second regeneration zone are passed into the lower portion of the dense fluid bed of catalyst in said first regeneration zone, and regenerated catalyst particles are passed from said second regeneration zone to said catalytic cracking zone at a temperature sufficiently elevated to convert quenched hydrocarbon vapors passed thereto to form a vaporous product boiling above 482° C. (900° F.) and comprising gasoline and light cycle oil product.

* * * * *